US006755446B2

(12) United States Patent
Mintz et al.

(10) Patent No.: US 6,755,446 B2
(45) Date of Patent: Jun. 29, 2004

(54) WASTE PIPE CONNECTOR

(75) Inventors: Charles J. Mintz, Highland Heights, OH (US); James A. Kovach, Parma, OH (US)

(73) Assignee: Superior Workshop Tool Company, Parma, OH (US)

( * ) Notice: Subject to any disclaimer, the term of this patent is extended or adjusted under 35 U.S.C. 154(b) by 0 days.

(21) Appl. No.: 10/173,071

(22) Filed: Jun. 17, 2002

(65) Prior Publication Data

US 2002/0163194 A1 Nov. 7, 2002

Related U.S. Application Data

(63) Continuation-in-part of application No. 09/747,460, filed on Dec. 22, 2000, now Pat. No. 6,481,763, which is a continuation-in-part of application No. 09/502,738, filed on Feb. 11, 2000, now abandoned.

(51) Int. Cl.[7] ............................................... F16L 19/00
(52) U.S. Cl. ................. 285/360; 285/129.1; 285/129.2; 285/362; 285/376
(58) Field of Search ............................. 285/360, 129.1, 285/129.2, 361, 362, 376

(56) References Cited

U.S. PATENT DOCUMENTS

| | | | |
|---|---|---|---|
| 1,181,060 A | | 4/1916 | Bennett |
| 1,193,446 A | | 8/1916 | Wells |
| 1,533,886 A | | 4/1925 | Mueller et al. |
| 1,698,667 A | | 1/1929 | Arnold |
| 1,911,659 A | * | 5/1933 | Weaver ...................... 285/110 |
| 2,198,905 A | | 4/1940 | Content |
| 2,449,121 A | | 9/1948 | Jones |
| 3,517,951 A | * | 6/1970 | Dunmire ...................... 285/110 |
| 3,582,113 A | | 6/1971 | Cauthery |
| 3,743,326 A | | 7/1973 | Courtot et al. |
| 3,747,964 A | | 7/1973 | Nilsen, Jr. |
| 3,751,078 A | * | 8/1973 | OBrien et al. .............. 285/339 |
| 3,765,706 A | | 10/1973 | Bram |
| 4,036,512 A | * | 7/1977 | Francis ....................... 285/111 |
| 4,313,649 A | | 2/1982 | Morikawa et al. |
| 4,648,633 A | | 3/1987 | Bergmann |
| 4,708,370 A | | 11/1987 | Todd |
| 4,763,470 A | | 8/1988 | Brown |
| 4,820,285 A | | 4/1989 | Leise et al. |

(List continued on next page.)

FOREIGN PATENT DOCUMENTS

| | | |
|---|---|---|
| BE | 0535512 A | 12/1958 |
| DE | 2205417 A | 10/1973 |

(List continued on next page.)

Primary Examiner—James R. Brittain
Assistant Examiner—Carlos Lugo
(74) Attorney, Agent, or Firm—Watts Hoffmann Co., L.P.A.

(57) ABSTRACT

An under-sink waste pipe system comprises first and second waste pipes telescoped together, a softly resilient seal ring that adapts a smaller pipe for coupling to a larger pipe, seals the waste-pipe juncture, and secures the waste pipes together, a locking ring for compressing the sealing ring into resilient locking and sealing engagement with the waste pipes, and a latching mechanism for securing the locking ring in place with the seal ring resiliently compressed a predetermined degree. The latching mechanism maintains the locking ring secured to the end flange structure and comprises at least first and second latching projections on the end flange structure that extend towards the locking ring, and projection guiding cam surfaces formed in the locking ring. Each projection guiding cam surface terminates in a notch-like latching recess. The projection is resiliently urged into the latching recess by the seal ring and snap moves into place to maintain the locking ring latched to the end flange structure and the seal ring resiliently compressed a predetermined degree. The snap-action of the latching mechanism signals the installer that waste pipes are properly coupled.

20 Claims, 6 Drawing Sheets

U.S. PATENT DOCUMENTS

| | | |
|---|---|---|
| 4,869,428 A | 9/1989 | Gombar |
| 4,960,153 A | 10/1990 | Bergsma |
| 5,397,196 A | 3/1995 | Boiret et al. |
| 5,447,337 A | 9/1995 | Ruckwardt |
| 5,667,251 A | 9/1997 | Prest |
| 5,704,659 A | 1/1998 | Lunder |
| 5,727,739 A | 3/1998 | Hamilton |
| 5,784,750 A | 7/1998 | Sankovic et al. |
| 5,887,913 A * | 3/1999 | Kojima et al. ............... 285/368 |
| 5,915,411 A | 6/1999 | Gilbert et al. |
| 5,961,160 A | 10/1999 | Fröhlich |
| 6,170,882 B1 | 1/2001 | Prest |

FOREIGN PATENT DOCUMENTS

| | | |
|---|---|---|
| DE | 3607231 A1 | 9/1987 |
| DE | 39011425 A1 | 7/1990 |
| DE | 19523842 | 2/1997 |
| DE | 29919783 | 2/2000 |
| FR | 0385508 A | 5/1908 |
| GB | 2066914 | 7/1981 |
| NL | 8600029 | 1/1986 |
| WO | PCT/US01/03213 | 5/2001 |

* cited by examiner

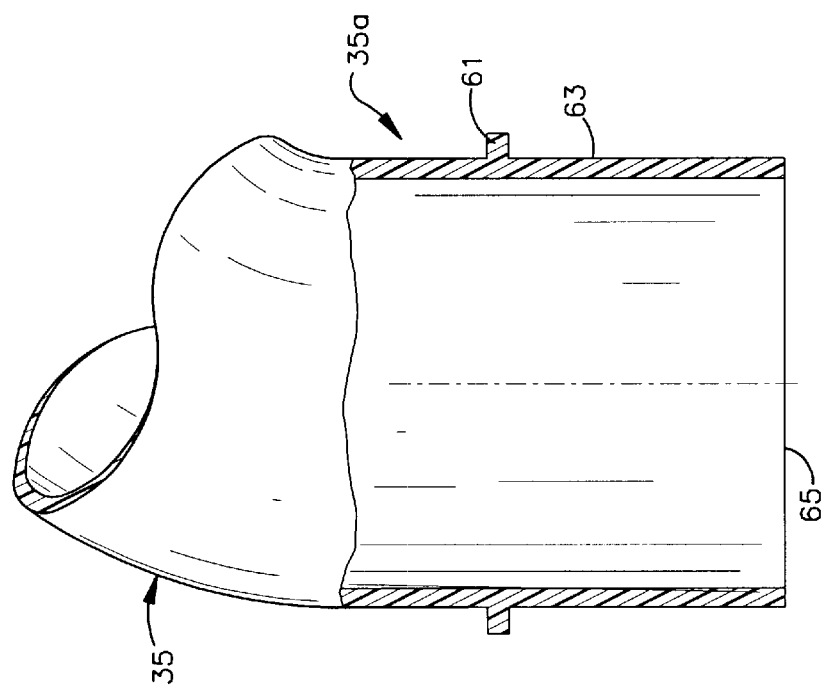
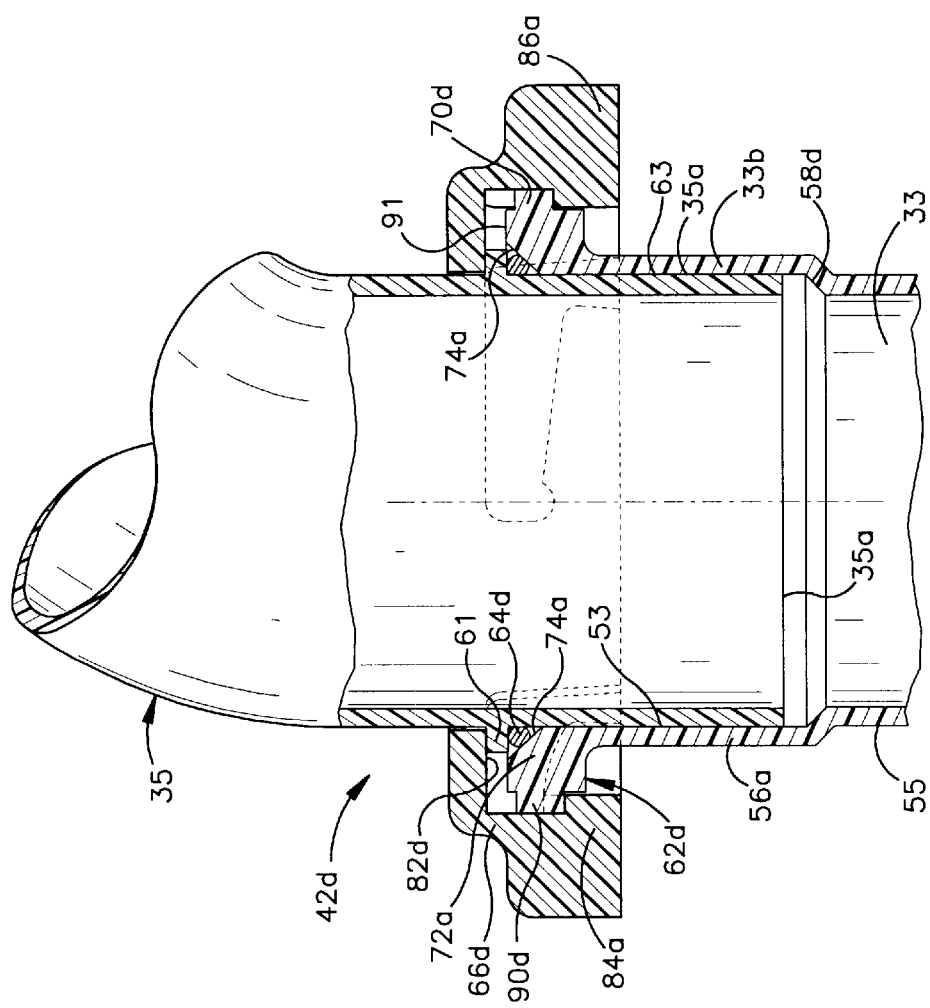

WASTE PIPE CONNECTOR

CROSS REFERENCE TO RELATED APPLICATIONS

The present application is a continuation-in-part of U.S. patent application Ser. No. 09/747,460, filed on Dec. 22, 2000, entitled "Waste Pipe Connector," now U.S. Pat. No. 6,481,763, which is a continuation-in-part of U.S. patent application Ser. No. 09/502,738, filed on Feb. 11, 2000, entitled "Waste Pipe Connector," which are incorporated herein by reference and that was abandoned.

FIELD OF INVENTION

The present invention relates generally to plumbing connectors. More specifically, the invention is directed to a waste pipe coupling for securely connecting and sealing telescoped waste pipes.

BACKGROUND OF THE INVENTION

Conventional residential kitchen sinks typically include a faucet, at least one water receptor basin, and a drain for each basin. Plumbing for directing sink wastewater to a septic system of some sort, or to a sewer, is confined in a small cabinet-like area underneath the sink. The basin drain may be connected to waste pipes in the plumbing directly or via a garbage disposer. The garbage disposer grinds large solids into smaller particulates that pass from the unit and through the waste pipes. Additionally, the plumbing beneath the residential sink can include connections to a dishwasher for carrying dishwasher wastewater into the plumbing and to the sewer or septic system.

The plumbing necessary for removing the wastewater from the basins, garbage disposer, and dishwasher generally consists of interconnected pipes leading to a common waste pipe. In one prior art proposal, interconnected pipes are telescoped together and connected to each other by means of a screw ring assembly. Prior art screw ring assemblies typically include a screw ring that compresses a relatively rigid, somewhat pliable, nylon or nylon-like plastic ring against the adjoining pipes to secure them. The plastic ring has a wedge-like, or triangular, cross sectional shape. The plastic ring has a central opening that fits around a male pipe end. Plastic pipe rings are available with different central opening sizes to accommodate different male pipe end sizes. The connection is made by placing the plastic ring and the screw ring around the male pipe end and then telescoping the pipes together. The screw ring is threaded and is screwed onto a threaded end of the female pipe so that the plastic ring is wedged into engagement with both pipes by the screw ring.

One problem with these types of connections is that wastewater flows and operation of the garbage disposer and/or dishwasher cause vibrations, shock loadings on the parts, and wrenching forces that, in turn, cause the prior art screw ring assemblies to loosen. The screw ring threads do not lock when the screw ring is initially tightened. The plastic ring is plastically deformed as it is wedged into place. The seal ring does not accommodate relative movement between the waste pipes that is created by vibrations in the systems. Moreover, the plastic deformation of the seal ring results in the seal ring failing to maintain pressure on the locking ring that creates frictional resistance to loosening the screw ring. The vibrations cause the screw ring to back away from the plastic ring along the pipe thread so that seal ring wedging forces are removed. Over time and use, these pipe connections are prone to leak. Moreover, the leakage generally worsens over time with further continued use.

Another problem with these screw assemblies is that multiple 360° rotations are required to complete assembly of the telescoped pipe connection. Since the plumbing is generally confined to a small area that may contain several interconnected pipes, the screw ring assembly is oftentimes difficult to access. Complete, continuous rotation by a wrench is often impeded by the other plumbing fixtures, pipes and under sink structural members. Whether the pipe joint is assembled under a sink or not, the installer is often unable to judge how tightly the screw ring has engaged the plastic ring and wedged it into place. Consequently, in some installations the screw rings were tightened too much while in others the screw rings were not tightened enough. When the screw ring was tightened too much, the plastic ring was over-compressed and distorted by the screw ring. The resulting pipe joint connection leaked. When the screw ring was too loose, the pipe joint leaked immediately or in a relatively short time because the parts were not properly engaged.

The present invention provides a new and improved under-sink waste pipe system that is so constructed and arranged that sealing failures due to vibrations caused by associated equipment are minimized, leakage resulting from waste pipe seals being compressed too forcefully or not forcefully enough are completely eliminated, and a tactile indication of proper installation is provided to the waste pipe installer.

SUMMARY OF THE INVENTION

The present invention concerns an under-sink waste pipe coupling for coupling a first, relatively smaller, waste pipe, and a second, relatively larger, waste pipe telescoped together wherein a softly resilient seal ring that occupies a space between the waste pipes and seals the juncture of the waste pipes; a locking ring compresses the sealing ring into resilient sealing engagement with the waste pipes; and, a latching mechanism secures the locking ring in place with the seal ring resiliently compressed a predetermined degree.

The first waste pipe has an end portion defining an outer cylindrical surface that extends into the second waste pipe. The second waste pipe has an end flange structure surrounding an end opening and defines a sealing face surrounding the first waste pipe cylindrical surface when the first waste pipe extends into the end opening. An inner surface of the second waste pipe is substantially spaced apart from the outer cylindrical surface of the first waste pipe.

The softly resilient seal ring adapts the first, relatively smaller, pipe for coupling to the second, relatively larger, pipe. The softly resilient seal ring engages the end flange structure sealing face and extends radially inward to engage the outer cylindrical surface of the first waste pipe. The seal ring contacts the first waste pipe outer surface and the end flange sealing face along bands of sealing contact.

The locking ring is secured to the end flange structure and defines an opening surrounding the first waste pipe, a force transmitting surface surrounding the opening, and a body section extending axially from the force transmitting surface. The force transmitting surface resiliently deforms the seal ring and urges the seal ring toward resilient engagement with the outer cylindrical surface of the end portion and the end flange sealing face. The seal ring sealingly engages the sealing face and sealingly and frictionally engages the end portion.

The latching mechanism maintains the locking ring secured to the end flange structure and comprises at least first and second latching projections, on one of the locking ring or end flange structure, that extend towards the other of the locking ring or end flange structure, and projection guiding cam surfaces formed in the other of the locking ring or end flange structure. The projection guiding cam surfaces each form a notch-like latching recess where the projection is disposed when the waste pipes are assembled together. The projection is resiliently urged into the recess by the seal ring to maintain the locking ring latched to the end flange structure and the seal ring resiliently compressed a predetermined degree.

In a first embodiment of the waste pipe coupling, the force transmitting surface of the locking ring engages the seal ring to resiliently deform the seal ring. In a second embodiment of the waste pipe coupling, the force transmitting surface of the locking ring engages a compression flange on the fist pipe to resiliently deform the seal ring.

The latching recess and cam surface are constructed and related so that the projection snap moves into the recess, providing a tactile indication that the pipes are properly assembled together.

In another embodiment of the invention an under-sink waste pipe system is provided that comprises first waste pipe having a first end communicating with a sewer or septic system, a trap pipe connected to the first waste pipe, a softly resilient seal ring for sealing the first waste pipe to the trap pipe, a locking ring associated with the seal ring for resiliently compressing the sealing ring onto sealing engagement with the first waste pipe and the trap pipe, and a latching mechanism for maintaining each locking ring secured in place with each sealing ring compressed to a predetermined degree.

The latching recess and cam surface are constructed and related so that the projection snaps into the recess, providing a tactile indication that the pipes are properly assembled together.

In one embodiment, the seal ring extends into the second waste pipe between the outer cylindrical surface of the first waste pipe and the inner cylindrical surface of the second waste pipe and the inner cylindrical surface of the second waste pipe to stabilize the first and second waste pipes. The seal ring may extend through the locking ring opening between the first waste pipe and the locking ring opening to further stabilize the coupling.

Additional features and advantages will become apparent from the following description of an illustrated embodiment made with reference to the accompanying drawings which form part of the specification and wherein:

BRIEF DESCRIPTION OF THE DRAWINGS

FIG. 6 is a cross sectional view seen approximately from the plane indicated by the line 6—6 of FIG. 1;

FIG. 7 is a cross sectional view similar to FIG. 6 with parts removed;

DESCRIPTION OF THE BEST MODE CONTEMPLATED FOR THE INVENTION

Figure 1:
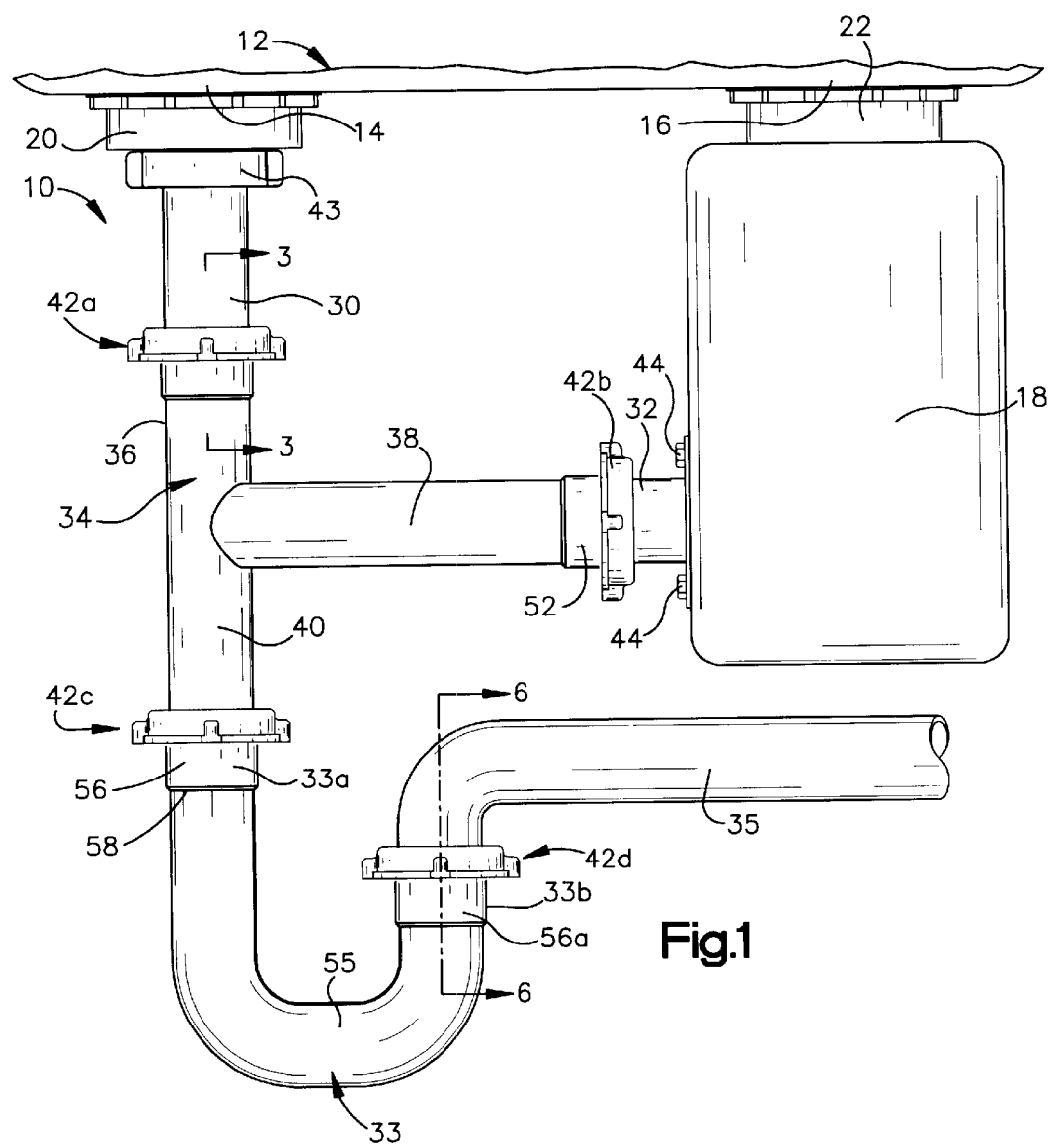
FIG. 1 is an elevational view of an under-sink waste pipe system embodying the invention connecting a sink drain pipe and a garbage disposer to a sewer or septic system.
Figure 2:
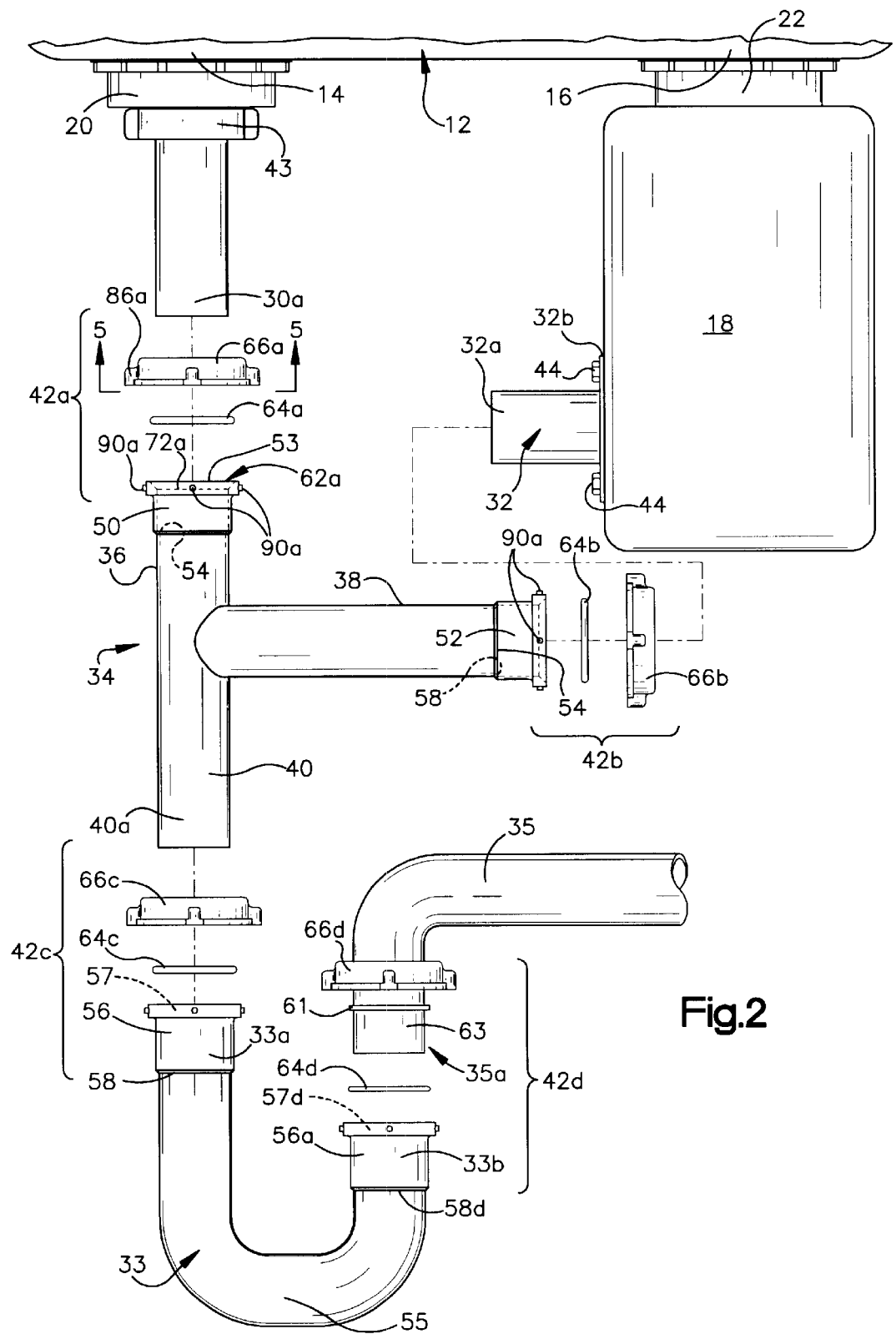
FIG. 2 is an exploded view of the waste pipe system of FIG. 1.

FIGS. 1 and 2 illustrate an under-sink waste pipe system 10 for directing waste water away from a sink 12 to a sewer, septic system, or the like, not illustrated. The sink 12 is partially and schematically illustrated as comprising first and second basins 14, 16, that are associated with a water supply, not illustrated, and a garbage disposer 18. The basin 14 is fitted with a drain fitting 20 through which the contents of the basin are drained into the system 10. The basin 16 is fitted with a drain fitting 22 through which the contents of the basin 16 are directed to the disposer 18 and then into the system 10.

The sink 12, i.e. the basins, garbage disposer, and associated cabinetry, may be of any conventional or suitable construction and is therefore not illustrated in detail. The disposer 18 contains motor driven comminuting blades for pulverizing material that is drained into the disposer from the basin 16. When the disposer motor is operating the comminuting blades rotate at high speed and create vibrational forces that are transmitted to the waste pipe system 10. When the motor is operated with one or more relatively large, dense articles inside, sudden, momentary shock forces are generated and transmitted to the waste pipe system. Moreover, the shock forces may be applied to the components of the waste pipe system as wrenching forces. These forces all tend to create relative movement between parts of the waste pipe system 10.

The system 10 is illustrated as comprising first and second waste pipes 30, 32 communicating with the basin drain 20 and the discharge of the garbage disposer unit 18, respectively, a trap waste pipe 33, a discharge waste pipe 35 connected to the trap waste pipe 33 for directing waste from the system 10 to a sewer or septic system, a T shaped waste pipe 34 having branches 36, 38, 40 connected to the waste pipes 30, 32, and 33, and waste pipe couplings 42 a–d for detachably connecting the pipes 30, 32, 33 and 35 together. The couplings 42 a–d connect the waste pipe junctures in a manner that seals the junctures and maintains the seal integrity notwithstanding vibrations and/or shock loadings transmitted to the system 10 from the disposer 18, other elements of the sink, or associated appliances such as dishwashers.

The waste pipe 30 has a smooth cylindrical end portion 30a (FIG. 2) that is telescoped into the waste pipe branch 36. The illustrated waste pipe 30 directs effluent from the basin 14 to the waste pipe 34 and has an end portion 30a having a nominal outside diameter of 1½ inches or 1¼ inches and a wall thickness of about 0.068 inches. The illustrated waste pipe 30 has an end flange (not shown) at its end opposite from the end portion 30a that is attached to the basin drain 20 by a threaded nut-like fastener 43 that serves to clamp a sealing gasket (not shown) between the drain fitting and the waste pipe 30. Although an end flange and fastener 43 are disclosed, the waste pipe 30 may be constructed for connection to the basin drain fitting by any suitable or conventional coupling construction.

The waste pipe 32 has a smooth cylindrical end portion 32a (FIG. 2) that is telescoped into the waste pipe branch 38. The illustrated waste pipe 32 directs the effluent from the disposer 18 to the sewer or septic system via the waste pipe 34. The illustrated waste pipe 32 has an end portion 32a having a nominal outside diameter of 1½ inches or 1¼ inches and a wall thickness of about 0.068 inches. The illustrated waste pipe 32 has an end flange 32b at the opposite end from the end portion 32a. The end flange 32b is shown as attached to the disposer 18 by threaded fasteners 44 that clamp a sealing gasket (not shown) between the drain fitting and the disposer. Although an end flange 32b and fasteners 44 are illustrated, the waste pipe 32 may be constructed for connection to the disposer or other elements of a drain system by any suitable or conventional coupling construction.

In the waste pipe 34 of the drawings the branches 36, 38 define bell-like structures 50, 52 at their ends, each forming an end opening 53 into which a respective waste pipe 30 or 32 extends. The inner diameter of each end-bell is slightly larger than the outer diameter of the associated waste pipe 30 or 32 so that the pipes telescope together relatively snugly but without appreciable friction. Each end-bell defines a step 54 in the branch inner diameter that limits the telescoping travel of the waste pipe 30 or 32 into the branch. The illustrated end-bells have an internal diameter that gradually narrows proceeding from the end opening 53 to the step 54 so the clearance between the waste pipes 30, 34 is greater near the end opening 53 than at the step 54.

The illustrated branch 40 has a smooth cylindrical end portion 40a (FIG. 2) that telescopes into the trap waste pipe 33. The illustrated waste pipe branch end portion 40a has a nominal outside diameter of 1½ inches or 1¼ inches and a wall thickness of about 0.068 inches.

The trap pipe 33 is formed with a "U" shaped bend 55 that forms a trap for retaining liquid from the sink 12 and sealing the system 10 from gases in the sewer or septic system. The trap pipe 33 defines a bell-like structure 56 at its first end 33a that forms an end opening 57 into which the waste pipe branch 40 extends. The inner diameter of the end-bell is slightly larger than the outer diameter of the branch 40 so that the pipes telescope together relatively snugly but without appreciable friction. The end-bell 56 defines a step 58 in the trap pipe inner diameter that limits the telescoping travel of the branch 40 into the trap. The illustrated end-bell has an internal diameter that gradually narrows proceeding from the end opening 57 to the step 58 so the clearance between the branch outer diameter and the trap inner diameter is greater near the end opening 57 than at the step 58.

The illustrated pipes 30, 32, 33, 34, and 35 are all formed from homogenous polypropylene plastic, but they may be formed from any suitable or conventional materials such as PVC or ABS plastics, brass, or other metals.

Figure 3:
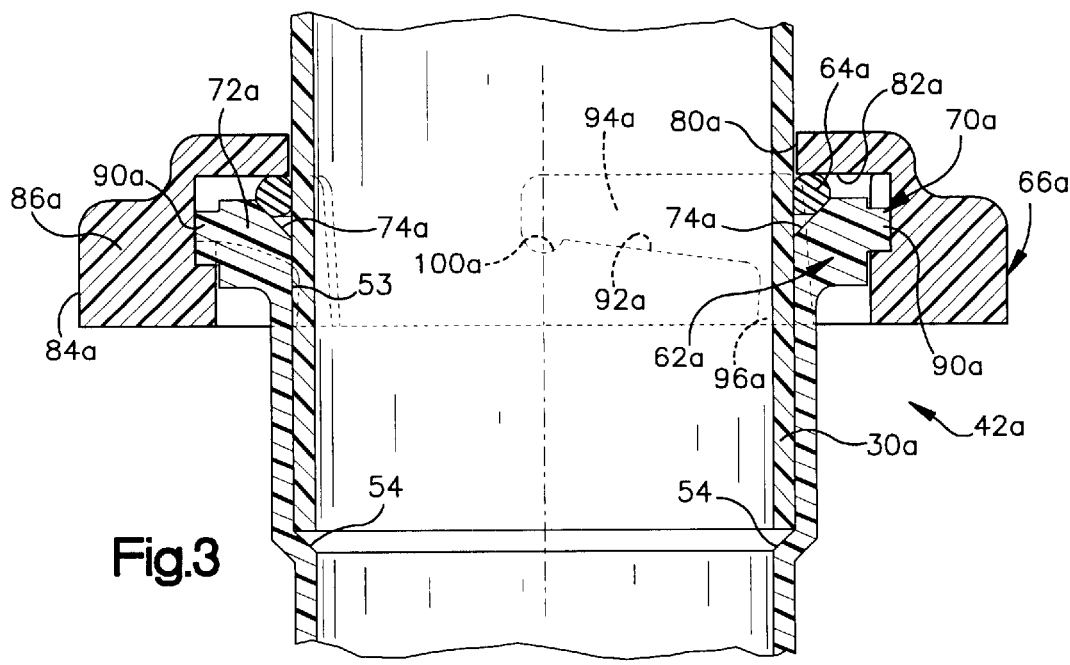
FIG. 3 is a cross sectional view seen approximately from the plane indicated by the line 3—3 of FIG. 1.

The waste pipe couplings 42a–42c secure the waste pipes 30, 32 and 33 to the waste pipe 34. The coupling 42d couples the trap pipe 33 to the discharge pipe 35. The illustrated couplings 42 are substantially the same so only the coupling 42a is described in complete detail. Referring to FIG. 3, the coupling 42a is comprised of the waste pipe end portion 30a, an end flange structure 62a surrounding the bell structure end opening 53 and the end portion 30a, a seal ring 64a sealingly engaging the end flange 62a and surrounding and engaging the end portion 30a, a locking ring 66a secured to the end flange structure 62a and resiliently engaging the seal ring, and a latching mechanism 70a for maintaining the locking ring 66a secured to the flange structure with the seal ring 64a compressed to a predetermined degree. The coupling 42a functions so that the waste pipe 30 is resiliently and frictionally connected to the waste pipe 36 by the compressed seal ring. The juncture of the waste pipes remains leak free despite vibrations, shock loads, and wrenching forces that are imposed by the disposer 18 and/or other associated equipment.

Referring to FIGS. 2 and 3, the end flange structure 62a comprises an annular flange body 72a extending about the opening 53 and a sealing face 74a surrounding the waste pipe end portion 30a. The illustrated flange body 72a is continuous with the waste pipe 34 and extends radially outwardly from the opening 53 and axially along the branch 36 from the end opening. The illustrated sealing face 74a is formed by a radially inwardly converging, smooth frustoconical surface formed in the end of the flange body 72a and extending about the end opening 53. The illustrated sealing face has a cone angle of about 45°. The flange body outer diameter is disposed radially outwardly from the major diameter of the sealing face 74a while the sealing face minor diameter surrounds the waste pipe end portion 30a with a small clearance space.

The seal ring 64a is a softly resilient ring that surrounds and resiliently engages the waste pipe end portion 30a and resiliently engages the end flange sealing face 74a. The seal ring 64a contacts the waste pipe outer surface and the end flange sealing face 74a along bands of sealing contact that are formed by elastic deformation of the seal ring. The resilient engagement force between the seal ring and the pipe end portion 30a creates a frictional force resisting any tendency for vibrational or shock forces to axially separate the waste pipe 30 from the branch 36. Further, the resilient engagement between seal ring and pipe assures that the ring and pipe remain engaged even when vibrations, shocks or other forces are applied that might otherwise tend to create lateral relative movement.

The illustrated sealing face 74a is angled relative to the pipe 30 so that when the seal ring is compressed axially by the locking ring, the seal ring is urged against the pipe 30 by the sealing face. While a frustoconical sealing face is illustrated, other sealing face shapes may be employed that function to assure seal ring contact with the pipe 30 and sealing engagement with the sealing face.

The illustrated seal ring 64a is formed from a nitrile material having a durometer hardness of between 45 and 55 and is softly resilient compared to the more common standard O-ring that has a durometer hardness of about 70, or higher. A seal ring having a durometer hardness of between 45 and 55 is selected to ensure that the coupling complies with ASTM standard F 409-96, Sections 7.3 and 8.3. This ASTM standard requires that the coupling be able to withstand a fluid pressure of 25 psi for one hour without leaking. Testing has shown that sealing rings having a durometer hardness greater than 60 do not reliably seal the waste pipe junctures when the coupling is subjected to the pressure-time conditions required by the ASTM standard. Among other reasons, the illustrated waste pipes are molded and have side seams that form leakage paths when seal rings having a durometer hardness greater than 60 are subjected to conditions required by the standard. Seal rings having a durometer hardness less than 60 are deformed into the side seams and block leakage. In applications that do not require compliance with ASTM standard F 409-96, Sections 7.3 and 8.3, the seal ring may have a durometer over about 60. For example, a standard O-ring may be used in these applications.

In its relaxed condition, the seal ring 64a is a torus having a nominal inside diameter of about 1.438 in. with the ring body having a circular cross sectional shape that is about 0.103 in. in diameter. The seal ring internal diameter is slightly smaller than the external diameter of the waste pipe end portion 32a (1½ in.) so that when the ring 64a is placed on the end portion 32a the cross sectional shape of the seal ring is resiliently deformed to a slightly elliptical configuration.

Although a seal ring for 1½ inch nominal diameter waste pipes has been illustrated and described, a toroidal seal ring having a durometer hardness of less than 60 is also used on a 1¼ inch nominal diameter waste pipe.

The locking ring 66a is secured to the end flange structure 62a and serves to produce a force for resiliently compressing the seal ring 64a against both the end flange and the waste pipe end portion 30a. The illustrated locking ring defines an opening 80a closely surrounding the end portion 30a, a force transmitting surface 82a surrounding the opening 80a, and a body section 84a extending axially from the seal ring engaging surface toward the end flange structure 62a. The force transmitting surface 82a is illustrated as a flat annular surface formed on a flange-like lip extending radially inwardly from the body section 84a. As illustrated, the force transmitting surface 82a extends in a direction normal to the longitudinal axis of the waste pipe 30. The force transmitting surface 82a effects resilient deformation of the seal ring so that the seal ring is urged toward resilient engagement with the outer cylindrical surface of the end portion 30a and the sealing face of the end flange. In the couplings 42a–42c the force transmitting surface 82a engages the seal ring while urging the seal ring into resilient engagement with the end portion outer cylindrical surface and the end flange structure sealing face 74a. The seal ring 64a sealingly engages the sealing face 74a and sealingly and frictionally engages the outer surface of the end portion 30a to maintain the waste pipes assembled. The softly resilient nature of the seal ring 64a results in the seal ring making sealing engagement with the end portion 30a, sealing face 74a, and the force transmitting surface 82a along annular bands of contact formed when the seal ring surface is locally flattened by the contact pressure.

When assembling the coupling 42a, the locking ring 66a is placed on the waste pipe 30 with the end portion 30a projecting through the opening 80a. The seal ring 64a is then assembled over the end portion and the end portion is telescoped into the waste pipe 36. The locking ring 66a is then pressed toward the end flange structure 62a so that the force transmitting surface 82a moves the seal ring 64a into contact with the flange body seal face 74a and the locking ring body section 84a surrounds the flange body 72a.

The locking ring body section 84a defines an inner periphery that is disposed about the flange body 72a when the coupling 42a is fully assembled. In the illustrated embodiment of the invention, manually grippable ears 86a project outwardly from the body section 84a. The ears 86a enable the locking ring 66a to be gripped and pushed on to the flange body, compressing the seal ring, and then turned to operate the latching mechanism 70a. The locking ring body is illustrated as having four ears 86a.

Figure 4:
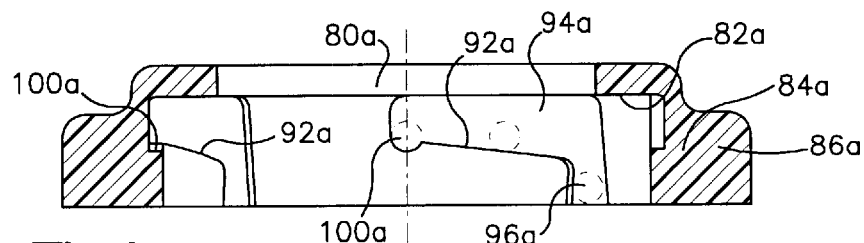
FIG. 4 is a cross sectional view similar to FIG. 3 with parts removed.
Figure 5:
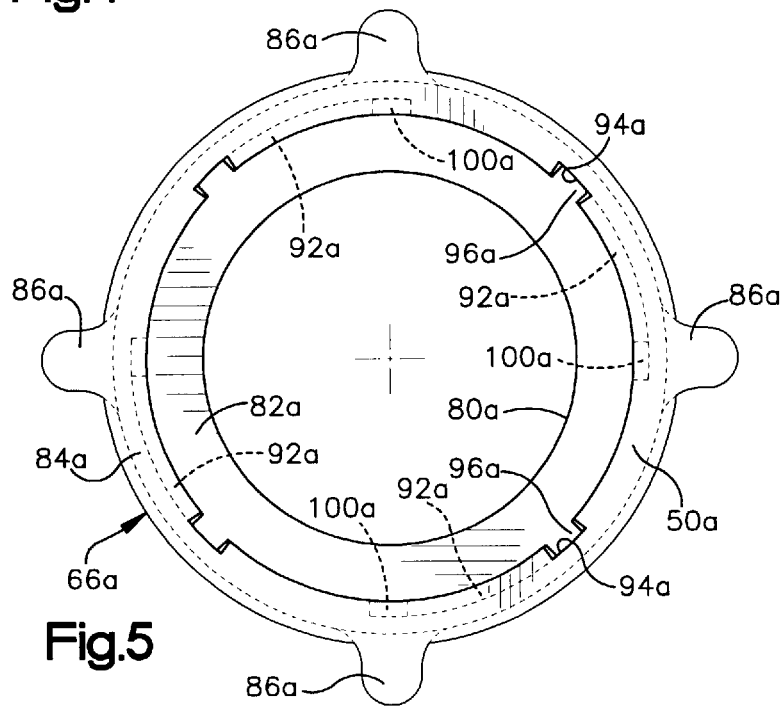
FIG. 5 is a cross sectional view seen approximately from the plane indicated by the line 5—5 of FIG. 2.

The latching mechanism 70a is constructed and arranged to maintain the locking ring 66a secured to the end flange structure 62a with the seal ring 64a resiliently compressed to a predetermined degree against the end portion 30a and the end flange structure 62a. The illustrated latching mechanism 70a comprises latching projections, or lugs, 90a (FIGS. 2 and 3) on the end flange structure 62a and projection guiding cam surfaces 92a (FIGS. 3–5) formed in the locking ring 66a. The projections could be formed on the locking ring and the cam surface in the end flange structure. The illustrated projections 90a extend radially outwardly from the flange body outer diameter towards the locking ring. In the illustrated coupling the projections are short cylindrical lugs that are integral, and continuous, with the flange body. Although the lugs and flange body are illustrated as formed by a single part, the lugs could be formed by inserts or a separate part attached to the flange body. Four lugs are illustrated, but more or fewer lugs can be provided.

Each cam surface 92a engages and guides a respective lug 90a and coacts with the lug to urge the seal ring 64a and flange body together. The illustrated cam surfaces are identical so only one is described in detail. The illustrated cam surface forms a side of a groove-like channel 94a formed in the inner periphery of the locking ring body section 84a. Each channel 94a opens in the axial side of the locking ring body 84a that confronts the flange body 72a. The open channel end has a short axially extending section 96a that is sized to receive one of the lugs as the locking ring is pressed axially onto the end flange body. The cam surface 92a extends along a helical path from the axially extending section 96a so that as the locking ring is manually rotated, the lug 90a is constrained to follow the cam surface 92a. The interaction between the cam surface 92a and the lug 90a forces the locking ring toward the flange body, compressing the seal ring 64a between the locking ring surface 82a, the flange body sealing surface 74a, and the waste pipe end portion 30a. The length and helix angle of the cam surface 92a are selected so that the seal ring 64a is resiliently compressed beyond the degree of compression that is desired for sealing and securing the coupling 42a. The seal ring 64a is sufficiently softly resilient, and the cam helix angle small enough, that the locking ring 66a is readily turned by hand during installation of the coupling.

While a helical cam surface is disclosed, the cam surface could take other configurations that would serve to compress the seal ring 64a during assembly of the locking ring to the flange body. Additionally, while the cam surface is illustrated as forming a side of a channel, each cam surface could as well be a side of a land formed on the locking ring body.

The illustrated latching mechanism 70a provides a tactile indication that the coupling 42a is properly installed. The cam surface 92a terminates in a notch-like latching recess 100a that extends axially toward the flange body 72a from the end of the cam face remote from the flange body 72a. When the lug 90a reaches the latching recess 100a, the seal ring urges the lug to the base of the latching recess where the lug is retained by the resilient seal ring force. The lug abruptly shifts into the latching recess resulting in a tactile snap-action that serves to signal the coupling installer that the coupling installation is complete. The lug thus over-travels along the cam surface 92a and over-compresses the seal ring as the locking ring is in the process of being installed. The seal ring relaxes somewhat from its over-compressed condition as it snap-moves the lug to the base of the latching recess.

The lug 90a remains latched in place in the recess 100a until the seal ring is over-compressed again and the locking ring is turned to return the lug to the cam surface 92a. In the meantime, the seal ring remains resiliently compressed in its locking and sealing condition. The depth of the recess 100a predetermines the degree of resilient compression experienced by the seal ring while the coupling remains assembled. Further, because the cam surface configuration is fixed by design and the latching recess depth is designed to accommodate the seal ring 64a, the seal ring 64a can not be installed in an over-compressed condition that could otherwise lead to leakage because of inadequate seal ring resilience. The fact that the seal ring is resiliently compressed for maintaining the coupling assembled assures that the seal ring remains adequately flexible to accommodate vibrational, shock and wrenching forces that may be applied to the coupling by operating the disposer, etc., without coupling leakage occurring.

It should be noted that although the coupling 42c between the trap pipe 33 and the pipe 34 is identical to the other couplings 42a, 42b the coupling flange structure is formed on the trap pipe 33 while the telescoping pipe end portion is formed on the branch 40.

The second trap pipe end 33b is coupled to the discharge pipe 35 (also referred to as a wall arm) by the coupling 42d. The trap pipe 33 defines a second bell-like structure 56a at its end 33b that forms an end opening 57d into which the discharge pipe 35 extends. The inner diameter of the end-bell is slightly larger than the outer diameter of the discharge pipe 35, so that the pipes telescope together relatively snugly but without appreciable friction. The illustrated end-bell has an internal diameter that gradually narrows proceeding from the end opening 57d to the step 58d so the clearance between the branch outer diameter and the trap inner diameter is greater near the end opening 57d than at the step 58d.

The illustrated discharge pipe 35 has an end portion 35a that telescopes into the trap pipe 33 (FIG. 6). The illustrated discharge pipe end portion 35a has a nominal outside diameter of 1½ inches or 1¼ inches and a wall thickness of about 0.068 inches.

The coupling 42d is constructed slightly differently from the couplings 42a–42c and is illustrated in FIGS. 2 and 6. The coupling 42d is comprised of the discharge pipe end portion 35a, an end flange structure 62d surrounding the bell structure end opening 57d and the end portion 35a, a seal ring 64d sealingly engaging the end flange 62d and surrounding and engaging the end portion 35a, a locking ring 66d secured to the end flange structure 62d and the compression flange 61, and a latching mechanism 70d for maintaining the locking ring secured to the flange structure with the seal ring 64d compressed to a predetermined degree. The coupling 42d functions so that the discharge pipe 35 is resiliently and frictionally connected to the trap pipe 33. The juncture between the trap pipe 33 and the discharge pipe 35 remains leak free despite vibrations, shock loads, and wrenching forces that are imposed by the disposer 18 and/or other associated equipment.

The locking ring 66d is the same as the locking rings 66a–66c. The coupling 42d differs from couplings 42a–42c in that it comprises a compression flange 61 for transmitting compressive force from the locking ring to the seal ring and the latching mechanism lugs 90d are positioned differently to accommodate the thickness of the compression flange 61. As illustrated in to FIGS. 2, 6, and 7, the compression flange 61 comprises an annular flange body extending about the cylindrical surface 63 of the discharge pipe 35. The illustrated compression flange is continuous with the discharge pipe 35 and extends radially from the cylindrical surface 63 with its opposite faces disposed in planes that are normal to the axis of the pipe 35. The pipe end portion 35a performs a piloting function and supports the seal ring in position during assembly of the coupling 42d. The compression flange 61 forms a stop that limits movement of the seal ring away from the flange 62d during assembly as well as limiting travel of the pipe end portion 35a into the end bell.

The force transmitting surface 82d of the locking ring 66d contacts the compression flange 61 and transmits compressive force through the compression flange 61 to the seal ring 64d. The seal ring is thus urged into sealing engagement with the end flange 62d, the pipe end portion 35a and the compression flange 61. The lugs are formed contiguous with the planar end flange 91 so that the locking ring 66d can accept the lugs into the channels 94a with both the compression flange 61 and seal ring 64d contained between the force transmitting surface 82d and the end flange 62d. In the illustrated coupling the lugs are cylindrical and located tangent to the plane of the 91. The compression flange 61 is locked between the locking ring 66d and the end flange structure 62d to prevent removal of the discharge pipe from the trap pipe 33, while enabling the seal ring to resiliently cushion axial shocks applied to the coupling.

Figure 8:
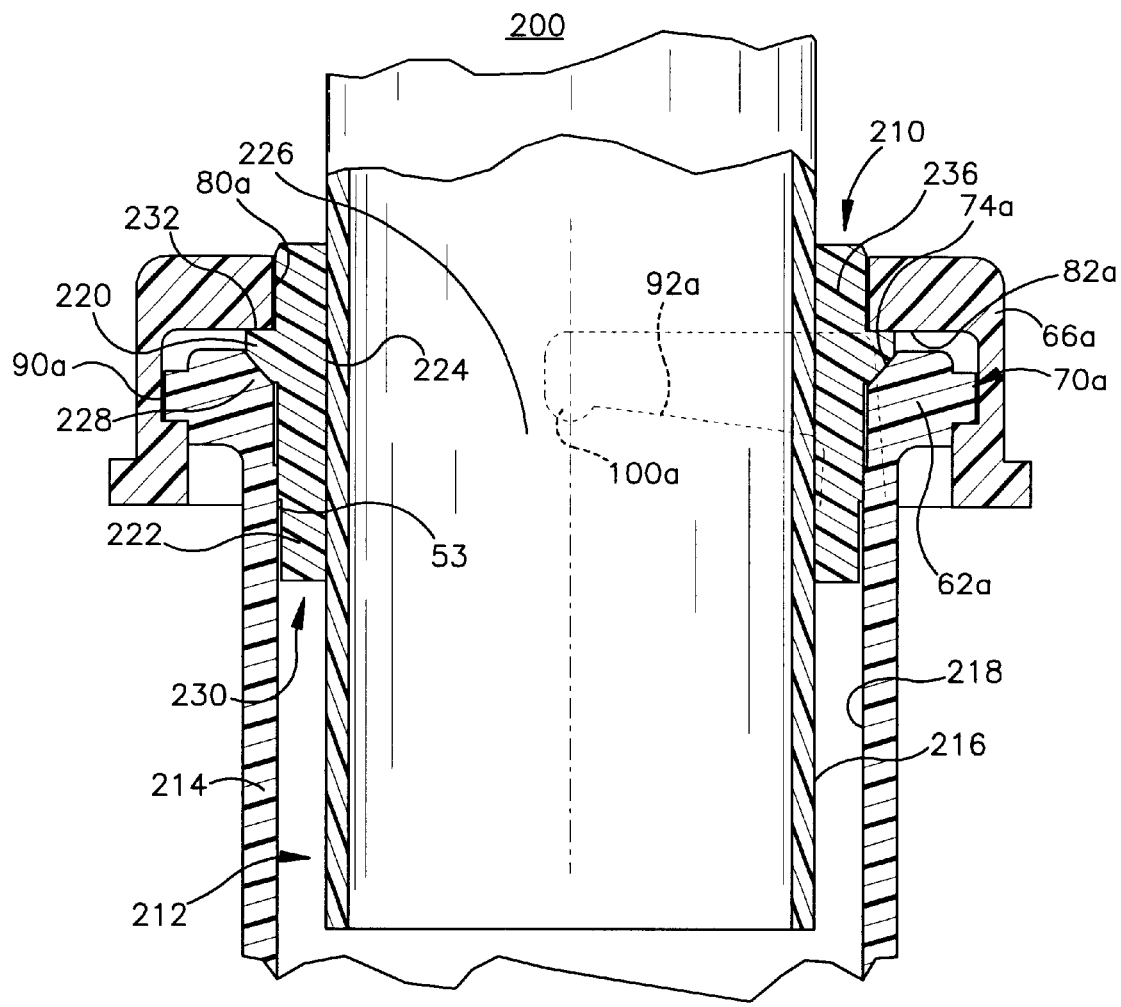
FIG. 8 is a cross sectional view similar to the view of FIG. 3 showing a coupling of a relatively smaller pipe to a relatively larger pipe.

FIG. 8 illustrates a coupling 200 that uses an alternate seal ring 210 that adapts a relatively smaller inner pipe 212 for coupling to a relatively larger outer pipe 214. In the embodiment illustrated by FIG. 8, the end flange structure 62a surrounding the bell structure end opening 53, the locking ring 66a secured to the end flange structure 62a, and the latching mechanism 70a for maintaining the locking ring 66a secured to the end flange structure are substantially the same as the ones used in coupling 42a, illustrated by FIG. 3. An end portion 226 of the smaller pipe 212 is similar to the end portion 30a, but has a smaller diameter in the illustrated embodiment. An outer cylindrical surface 216 of the smaller pipe 212 is substantially spaced apart from an inner cylindrical surface 218 of the larger pipe 214. The seal ring 210 includes a softly resilient annular sealing portion 220. The annular sealing portion 220 includes an inner surface 224 (FIG. 8) that surrounds and engages the outer cylindrical surface 216 of the end portion 226 of the smaller pipe 212 along a band of sealing contacts. The sealing portion 220 extends radially outward past the inner cylindrical surface 218 of the larger pipe 214 to a sealing face engaging surface 228. The sealing face engaging surface 228 engages a sealing face 74a of the end flange structure 62a along a band of sealing contacts.

In one embodiment, the seal ring 210 includes an annular pipe stabilizing portion 222, extending axially from the sealing portion 220. The annular pipe stabilizing portion 222 extends into the larger pipe 214 and occupies a space 230 between the outer cylindrical surface 216 and the inner cylindrical surface 218. The pipe stabilizing portion inhibits axial and radial movement of the smaller pipe with respect to the larger pipe, resulting in a more secure coupling.

In the illustrated embodiment, the sealing face engaging surface 228 of the sealing portion 220 is formed by a radially inwardly converging, smooth frusto-conical surface that corresponds to the sealing face 74a. The illustrated sealing face engaging surface 228 has a cone angle of about 45°.

Figure 9:
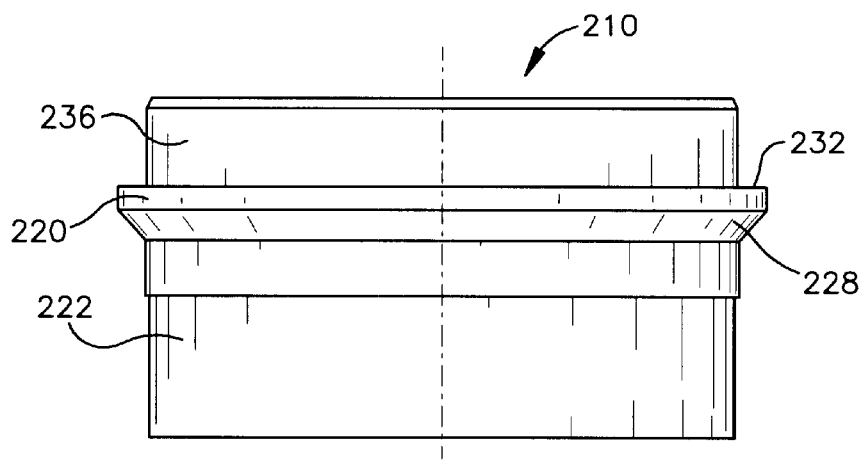
FIG. 9 is a side elevational view of a seal ring of one embodiment that adapts a relatively smaller pipe for coupling to a relatively larger pipe.
Figure 10:
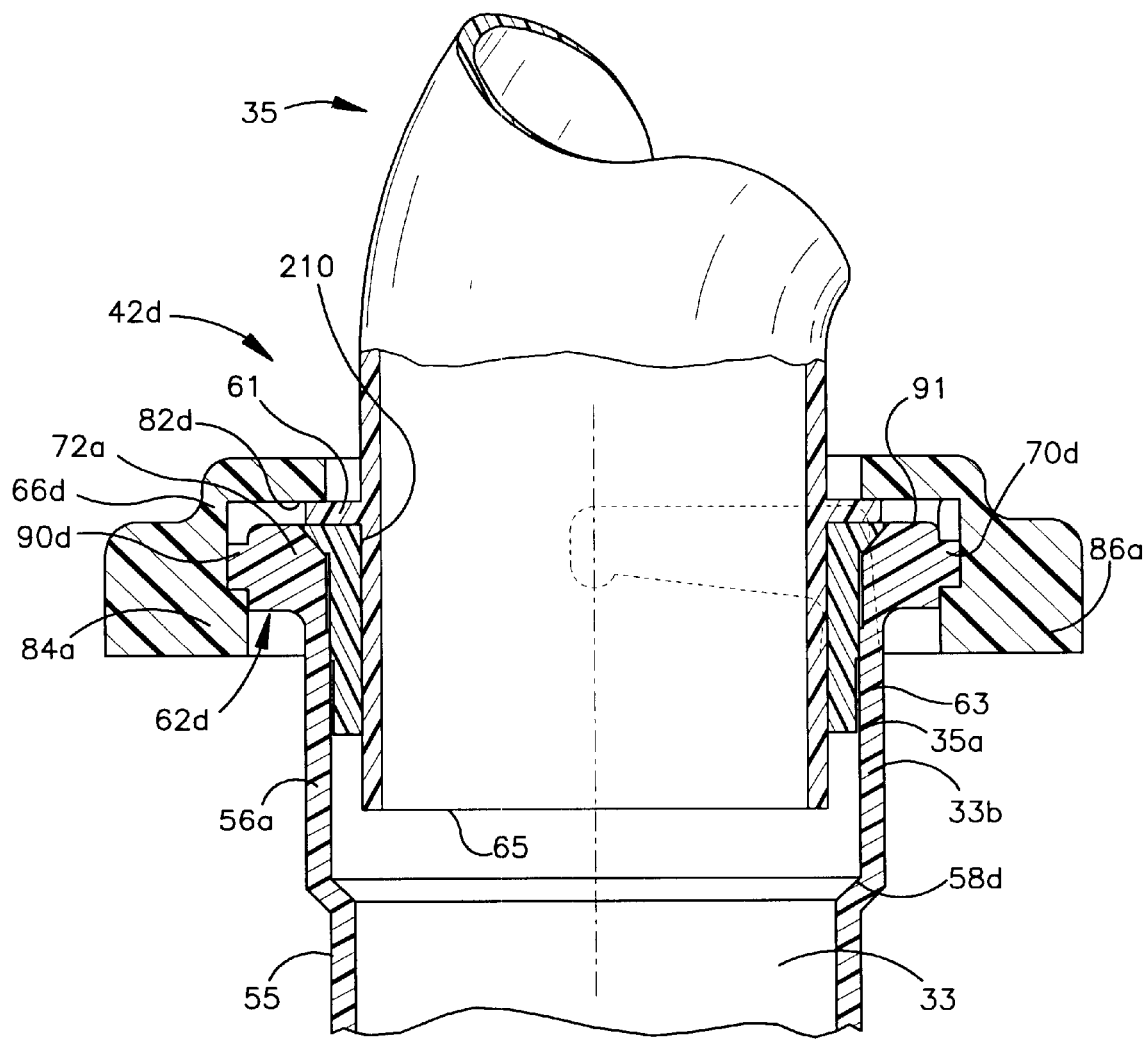
FIG. 10 is a cross sectional view similar to the view of FIG. 6 showing a coupling of a relatively smaller pipe to a relatively larger pipe.

In the embodiment, illustrated by FIGS. 8 and 9, the sealing portion 220 includes a planar engagement surface 232. In this embodiment, the force transmitting surface 82a of the locking ring engages the engagement surface 232 to effect resilient deformation of the sealing portion 220 so that the sealing portion is urged toward resilient engagement with the outer cylindrical surface 218 of the smaller pipe 212 and the sealing face 74a of the end flange.

The pipe stabilizing portion 222 is cylindrical and extends axially from the sealing portion 220. The illustrated stabilizing portion 222 resiliently engages the inner cylindrical surface of the larger pipe 214 and the outer cylindrical surface 216 of the smaller pipe to stabilize the coupling 200.

In the embodiment illustrated by FIGS. 8 and 9, the seal ring 210 includes a locking ring stabilizing portion 236. The locking ring stabilizing portion end extends axially from the sealing portion 220. The locking ring stabilizing portion extends through the locking ring opening 80a and occupies a space between the locking ring opening 80a and the smaller pipe 212 to further stabilize the coupling.

The seal ring 210 is made from a softly resilient material. The seal ring 210 surrounds and engages the end portion 226 to effectively increase the diameter of the smaller pipe 212. The sealing portion 220 of the seal ring 210 resiliently engages the end flange sealing face 74a. The seal ring 210 contacts the outer surface 216 and end flange sealing face 74a along bands of sealing contacts that are formed by elastic deformation of the sealing portion 220 of the seal ring 210. The resilient engagement force between the seal ring and the pipe end portion 226 creates a frictional force resisting any tendency for vibrational or shock forces to axially separate the smaller pipe 212 from the larger pipe 214.

The locking ring 66a is secured to the end flange structure 62a and serves to produce a force for resiliently compressing the sealing portion 220 against both the end flange and the smaller pipe outer cylindrical surface 216. In the embodiment illustrated in FIG. 8, the opening 80a surrounds the locking ring stabilizing portion 236 of the seal ring 216. The force transmitting surface 82a effects resilient deformation of the sealing portion 220 so that the sealing portion is urged toward resilient engagement with the outer cylindrical surface 216 of the smaller pipe and the sealing face of the end flange. The seal ring 210 sealingly engages the sealing face 74a and sealingly and frictionally engages the outer surface 216 of the smaller pipe 212 to maintain the pipes assembled. The softly resilient nature of the seal ring 210 results in the seal ring making sealing engagement with the outer surface 216 and sealing face 74a.

When assembling the coupling 200, the locking ring 66a is placed on the smaller pipe 212 with the end portion 226 projecting through the opening 80a. The seal ring 210 is then assembled over the end portion. The end portion 226 and pipe stabilizing portion 222 are telescoped into the larger pipe 214. The locking ring 66a is then pressed toward the end flange structure 62a so that the force transmitting surface 82a moves the sealing portion 220 into contact with the end flange seal face 74a and the locking ring body section 84a surrounds the flange body 72a.

The latching mechanism 70a is constructed and arranged to maintain the locking ring 66a secured to the end flange structure 62a with the sealing portion 220 compressed to a predetermined degree against the outer surface 216 and the end flange structure 62a. The latching mechanism resiliently compresses the sealing portion 220 beyond the degree of compression that is desired for sealing and securing the coupling 200. When the lug 90a reaches the latching recess 100a, the sealing portion 220 urges the lug to the base of the latching recess where the lug is retained by resilient seal ring force. The lug abruptly shifts into the latching recess resulting in a tactile snap-action that serves to signal the coupling installer that coupling installation is complete. The lug thus over-travels along the cam surface 92a and over-compresses the sealing portion 220 as the locking ring is in the process of being installed. The sealing portion relaxes somewhat from its over-compressed condition as it snap-moves the lug to the base of the latching recess. The seal ring 210 is sufficiently softly resilient, and the cam helix angle small enough, that the locking ring 66a is readily turned by hand during installation of the coupling.

The lug 90a remains latched in place in the recess 100a until the seal ring is over-compressed again and the locking ring is turned to return the lug to the cam surface 92a. In the meantime, the sealing portion 220 remains resiliently compressed in its locking and sealing condition. The depth of the recess 100a predetermines the degree of resilient compression experienced by the sealing portion 220 while the coupling remains assembled. The latching mechanism 70a does not allow the sealing portion 220 to be installed in an over-compressed condition. The resiliently compressed sealing portion accommodates vibrational, shock and wrenching forces that may be applied to the coupling.

The seal ring 210 illustrated in FIG. 9 could be used in one or more of the couplings 42a–42c to accommodate a smaller inner pipe.

In one embodiment, the locking ring stabilizing portion 236 is omitted from the seal ring 210. In this embodiment, the seal ring 210 can be used in the coupling 42d to accommodate a smaller pipe having a compression flange 61. In this embodiment, the compression flange 61 engages the sealing portion 220 to bring the sealing portion into engagement with the end flange sealing face and the outer cylindrical surface of the smaller pipe.

While the invention has been illustrated and described in considerable detail, the invention is not to be considered limited to the precise construction disclosed. Various adaptations, modifications, and uses of the invention may occur to those skilled in the art to which the invention pertains. The intention is to cover all such adaptations, modifications, and uses that fall within the spirit or scope of the appended claims.

We claim:

1. In an under-sink waste pipe system having first and second waste pipes connected together for carrying wastewater away from a basin, a waste pipe coupling comprising:
   a) a first waste pipe end portion defining an outer cylindrical surface of said first waste pipe;
   b) a second waste pipe end portion defining an inner cylindrical surface of said second waste pipe;
   c) an end flange structure of said second waste pipe surrounding an end opening, said outer cylindrical surface of said first waste pipe extending into said end opening, said first waste pipe outer cylindrical surface being substantially spaced apart from said second waste pipe inner cylindrical surface, said end flange structure defining a sealing face surrounding said first waste pipe outer cylindrical surface when said first waste pipe extends into said end opening;
   d) a softly resilient seal ring engaging said end flange sealing face and extending radially inward past said inner cylindrical surface to engage said outer cylindrical surface of said first waste pipe, said seal ring contacting said first waste pipe outer surface and said end flange sealing face along bands of sealing contact, said seal ring including a stabilizing portion that occupies a space between the outer cylindrical surface of the first pipe and the inner cylindrical surface of second pipe, said stabilizing portion itself inhibiting radial movement of said first waste pipe with respect to the second waste pipe;
   e) a locking ring secured to said end flange structure, said locking ring defining an opening surrounding said first waste pipe, a force transmitting surface surrounding said opening, and a body section extending axially from said force transmitting surface toward said end flange structure, said force transmitting surface effecting resilient deformation of said seal ring so that said seal ring is urged toward resilient engagement with the outer cylindrical surface of said end portion and said sealing face of said end flange structure, said seal ring sealingly engaging said sealing face and sealingly engaging said end portion; and, f) a latching mechanism maintaining said locking ring secured to said end flange structure, said latching mechanism comprising at least first and second latching projections on one of said locking ring or end flange structure, each projection extending towards said other of said locking ring or end flange structure, and projection guiding cam surfaces formed in said other of said locking ring or end flange structure, each projection guiding cam surface terminating in a notch-like latching recess where said projection is disposed when said waste pipes are assembled together, said projection resiliently urged into said latching recess by said seal ring to maintain said locking ring latched to said end flange structure and said seal ring resiliently compressed a predetermined degree.

2. The coupling of claim 1 wherein said force transmitting surface engages said seal ring to resiliently deform said seal ring.

3. The coupling claimed in claim 1 wherein said seal ring has a slightly smaller inside diameter than the outside diameter of the first waste pipe.

4. The coupling claimed in claim 1 wherein said end flange sealing face is conical and converges toward said first waste pipe in a direction proceeding away from said locking ring.

5. The coupling claimed in claim 1 wherein said latching projections are formed on said end flange structure and extend radially outwardly therefrom and said projection guiding cam surfaces are formed on said locking ring.

6. The coupling claimed in claim 1 wherein said locking projection guiding cam surfaces are formed on the locking ring body confronting the end flange structure, said cam surfaces defining a ramp section extending to said latching recess, said ramp section assuring that said sealing ring is resiliently compressed to a greater extent than said predetermined degree before said projections enter said latching recess.

7. The coupling of claim 1 wherein said end flange includes a planar end face, said latching projections are cylindrical lugs that are tangent to said planar end face.

8. The coupling of claim 1 wherein the outer cylindrical surface of said first waste pipe is approximately 1.25 inches in diameter and the inner cylindrical surface of said second waste pipe is approximately 1.5 inches in diameter.

9. In an under-sink waste pipe system having first and second waste pipes connected together for carrying wastewater away from a basin, a waste pipe coupling comprising:

a) a first waste pipe end portion defining an outer cylindrical surface of said first waste pipe;

b) a second waste pipe end portion defining an inner cylindrical surface of said second waste pipe;

c) an end flange structure of said second waste pipe surrounding an end opening, said outer cylindrical surface of said first waste pipe extending into said end opening, said first waste pipe outer cylindrical surface being substantially spaced apart from said second waste pipe inner cylindrical surface, said end flange structure defining a sealing face surrounding said first waste pipe outer cylindrical surface when said first waste pipe extends into said end opening;

d) a softly resilient seal ring engaging said end flange sealing face and extending radially inward past said inner cylindrical surface to engage said outer cylindrical surface of said first waste pipe, said seal ring contacting said first waste pipe outer surface and said end flange sealing face along bands of sealing contact;

e) a locking ring secured to said end flange structure, said locking ring defining an opening surrounding said first waste pipe, a force transmitting surface surrounding said opening, and a body section extending axially from said force transmitting surface toward said end flange structure, said force transmitting surface effecting resilient deformation of said seal ring so that said seal ring is urged toward resilient engagement with the outer cylindrical surface of said end portion and said sealing face of said end flange structure, said seal ring sealingly engaging said sealing face and sealingly engaging said end portion; and, f) a latching mechanism maintaining said locking ring secured to said end flange structure, said latching mechanism comprising at least first and second latching projections on one of said locking ring or end flange structure, each projection extending towards said other of said locking ring or end flange structure, and projection guiding cam surfaces formed in said other of said locking ring or end flange structure, each projection guiding cam surface terminating in a notch-like latching recess where said projection is disposed when said waste pipes are assembled together, said projection resiliently urged into said latching recess by said seal ring to maintain said locking ring latched to said end flange structure and said seal ring resiliently compressed a predetermined degree, said coupling further comprises a compression flange on said first waste pipe interposed between said force transmitting surface and said seal ring, said force transmitting surface engaging said compression flange on said first pipe to resiliently deform said seal ring.

10. In an under-sink waste pipe system having first and second waste pipes connected together for carrying wastewater away from a basin, a waste pipe coupling comprising:

a) a first waste pipe end portion defining an outer cylindrical surface of said first waste pipe;

b) a second waste pipe end portion defining an inner cylindrical surface of said second waste pipe;

c) an end flange structure of said second waste pipe surrounding an end opening, said outer cylindrical surface of said first waste pipe extending into said end opening, said first waste pipe outer cylindrical surface being substantially spaced apart from said second waste pipe inner cylindrical surface, said end flange structure defining a sealing face surrounding said first waste pipe outer cylindrical surface when said first waste pipe extends into said end opening;

d) a softly resilient seal ring engaging said end flange sealing face and extending radially inward past said inner cylindrical surface to engage said outer cylindrical surface of said first waste pipe, said seal ring contacting said first waste pipe outer surface and said end flange sealing face along bands of sealing contact;

e) a locking ring secured to said end flange structure, said locking ring defining an opening surrounding said first waste pipe, a force transmitting surface surrounding said opening, and a body section extending axially from said force transmitting surface toward said end flange structure, said force transmitting surface effecting resilient deformation of said seal ring so that said seal ring is urged toward resilient engagement with the outer cylindrical surface of said end portion and said sealing face of said end flange structure, said seal ring sealingly engaging said sealing face and sealingly engaging said end portion; and, f) a latching mechanism maintaining said locking ring secured to said end flange structure, said latching mechanism comprising at least first and second latching projections on one of said locking ring or end flange structure, each projection extending towards said other of said locking ring or end flange structure, and projection guiding cam surfaces formed in said other of said locking ring or end flange structure, each projection guiding cam surface terminating in a notch-like latching recess where said projection is disposed when said waste pipes are assembled together, said projection resiliently urged into said latching recess by said seal ring to maintain said locking ring latched to said end flange structure and said seal ring resiliently compressed a predetermined degree, said seal ring extends through said locking ring opening between said locking ring opening and said first waste pipe.

11. In an under-sink waste pipe system comprising:

a) a first waste pipe having a first end portion in communication with a sewer or septic system and a second end portion defining an outer cylindrical surface;

b) a trap pipe having an end flange structure surrounding an end opening and an inner cylindrical surface, said outer cylindrical surface of said first waste pipe extending into said end opening, said outer cylindrical surface being substantially spaced apart from said inner cylindrical surface, said end flange structure defining a sealing face surrounding said first waste pipe outer cylindrical surface when said first waste pipe extends into said end opening;

c) a softly resilient seal ring engaging said end flange structure sealing face and extending radially inward past said inner cylindrical surface to engage said outer cylindrical surface of said first pipe, said seal ring contacting said first waste pipe outer surface and said end flange sealing face along bands of sealing contact, said seal ring including a stabilizing portion that occupies a space between the outer cylindrical surface of the first pipe and the inner cylindrical surface of the trap pipe, said stabilizing portion itself inhibiting radial movement of said first pipe with respect to said trap pipe;

d) a locking ring secured to said end flange structure, said locking ring defining an opening surrounding said first waste pipe, a force transmitting surface surrounding said opening and a body section extending axially from said force transmitting surface, said force transmitting surface effecting resilient deformation of said seal ring for urging said seal ring toward resilient engagement with the outer cylindrical surface of said second end portion and said sealing face of said end flange structure, said seal ring sealingly engaging said sealing face and sealingly engaging said second end portion; and, e) a latching mechanism maintaining said locking ring secured to said end flange structure, said latching mechanism comprising at least first and second latching projections on one of said locking ring or end flange structure, each projection extending towards said other of said locking ring or end flange structure, and projection guiding cam surfaces formed in said other of said locking ring or end flange structure, each projection guiding cam surfaces terminating in a notch-like latching recess where said projection is disposed when said waste pipes are assembled together, said projection resiliently urged into said latching recess by said seal ring to maintain said locking ring latched to said end flange structure and said seal ring resiliently compressed a predetermined degree.

12. The waste-pipe system claimed in claim 11 wherein said force transmitting surface engages said seal ring to resiliently deform said seal ring.

13. The coupling claimed in claim 11 wherein said seal ring extends into said second waste pipe between said outer cylindrical surface of said first waste pipe and said inner cylindrical surface of said second waste pipe.

14. The system claimed in claim 11 wherein each of said end flange sealing faces is conical and converges toward said first waste pipe in a direction proceeding away from said locking ring.

15. The system claimed in claim 11 wherein said latching projections are formed on said end flange structure and extend radially outwardly therefrom and said projection guiding cam surfaces are formed on said locking ring.

16. The system claimed in claim 11 wherein said locking projection guiding cam surfaces are formed on said locking ring body confronting the associated end flange structure, said cam surfaces defining a ramp section extending to said latching recess, said ramp sections assuring that said sealing ring is resiliently compressed to a greater extent than said predetermined degree before said projections enter said latching recesses.

17. The coupling of claim 11 wherein the outer cylindrical surface of said first waste pipe is approximately 1.25 inches in diameter and the inner cylindrical surface of said trap pipe is approximately 1.5 inches in diameter.

18. In an under-sink waste pipe system having first and second waste pipes connected together for carrying wastewater away from a basin, a waste pipe coupling comprising:

a) a first waste pipe end portion defining an outer cylindrical surface of said first waste pipe;

b) a second waste pipe end portion defining an inner cylindrical surface of said second waste pipe;

c) an end flange structure of said second waste pipe surrounding an end opening, said outer cylindrical surface of said first waste pipe extending into said end opening, said first waste pipe outer cylindrical surface being substantially spaced apart from said second waste pipe inner cylindrical surface, said end flange structure defining a sealing face surrounding said first waste pipe outer cylindrical surface when said first waste pipe extends into said end opening;

d) a softly resilient seal ring engaging said end flange sealing face and extending radially inward past said inner cylindrical surface to engage said outer cylindrical surface of said first waste pipe, said seal ring contacting said first waste pipe outer surface and said end flange sealing face along bands of sealing contact;

e) a locking ring secured to said end flange structure, said locking ring defining an opening surrounding said first waste pipe, a force transmitting surface surrounding said opening, and a body section extending axially from said force transmitting surface toward said end flange structure, said force transmitting surface effecting resilient deformation of said seal ring so that said seal ring is urged toward resilient engagement with the outer cylindrical surface of said end portion and said sealing face of said end flange structure, said seal ring sealingly engaging said sealing face and sealingly engaging said end portion; and, f) a latching mechanism maintaining said locking ring secured to said end flange structure, said latching mechanism comprising at least first and second latching projections on one of said locking ring or end flange structure, each projection extending towards said other of said locking ring or end flange structure, and projection guiding cam surfaces formed in said other of said locking ring or end flange structure, each projection guiding cam surface terminating in a notch-like latching recess where said projection is disposed when said waste pipes are assembled together, said projection resiliently urged into said latching recess by said seal ring to maintain said locking ring latched to said end flange structure and said seal ring resiliently compressed a predetermined degree, said seal ring extends through said locking ring opening between said locking ring opening and said first waste pipe.

19. A seal ring for use in an under-sink waste pipe system that includes first and second waste pipes and a locking ring, wherein an outer cylindrical surface of the first waste pipe is substantially spaced apart from an inner cylindrical surface of the second waste pipe, the second waste pipe defines an end flange structure that defines a sealing face surrounding the first waste pipe, and the locking ring includes an opening that surrounds the first waste pipe and is secured to the end flange structure of the second waste pipe:

said seal ring adapts a relatively smaller first pipe for coupling to a relatively larger second pipe, and comprises:

a) a softly resilient annular sealing portion that includes an inner surface that surrounds and engages the first waste pipe end portion along a band of sealing contact, said seal ring extending radially outward from said inner surface past the inner surface of the second waste pipe to a sealing face engaging surface that engages the end flange structure sealing face along a band of sealing contact; and, b) an annular pipe stabilizing portion extending axially from said sealing portion into said second waste pipe, said pipe stabilizing portion occupies a space between said outer cylindrical surface of said first waste pipe and said inner cylindrical surface of said second waste pipe, said stabilizing portion itself inhibiting radial movement of said first pipe with respect to said second pipe.

20. The seal ring of claim 19 further comprising a locking ring stabilizing portion extending axially from said sealing portion through said locking ring opening, said locking ring stabilizing portion occupies a space between said locking ring opening and said first waste pipe.

* * * * *